(12) United States Patent
Kinkead

(10) Patent No.: US 7,869,303 B2
(45) Date of Patent: Jan. 11, 2011

(54) METHOD FOR NOISE SUPPRESSION IN SEISMIC SIGNALS USING SPATIAL TRANSFORMS

(75) Inventor: Jack Dewayne Kinkead, Cypress, TX (US)

(73) Assignee: PGS Geophysical AS, Lysaker (NO)

( * ) Notice: Subject to any disclaimer, the term of this patent is extended or adjusted under 35 U.S.C. 154(b) by 772 days.

(21) Appl. No.: 11/893,032

(22) Filed: Aug. 14, 2007

(65) Prior Publication Data

US 2009/0046536 A1 Feb. 19, 2009

(51) Int. Cl.
*G01V 1/00* (2006.01)
(52) U.S. Cl. .......................... 367/21; 702/17
(58) Field of Classification Search .............. 367/21; 702/14, 17, 189
See application file for complete search history.

(56) References Cited

U.S. PATENT DOCUMENTS

| | | | |
|---|---|---|---|
| 5,241,514 A | 8/1993 | Ehlers | |
| 5,448,531 A * | 9/1995 | Dragoset, Jr. | 367/45 |
| 5,572,483 A * | 11/1996 | Chambers et al. | 367/45 |
| 5,761,152 A | 6/1998 | Jacobsen et al. | |
| 5,818,795 A | 10/1998 | Hawkins et al. | |
| 6,535,818 B1 * | 3/2003 | Baeten | 702/17 |
| 6,751,559 B2 | 6/2004 | Fookes et al. | |
| 2006/0155477 A1* | 7/2006 | Matson et al. | 702/14 |

FOREIGN PATENT DOCUMENTS

GB 2393252 3/2004

OTHER PUBLICATIONS

United Kingdom Patent Office Search Report, Nov. 26, 2008.

* cited by examiner

*Primary Examiner*—Mark Hellner
(74) *Attorney, Agent, or Firm*—E. Eugene Thigpen; Shannon Powers; Richard A. Fagin

(57) ABSTRACT

A method for identifying a position of a source of noise in a marine seismic record includes defining, for at least one shot record, a set of possible noise source positions. A difference between travel time of noise from each possible noise source position to each of a plurality receiver position for the at least one shot record is determined. Signals from at least a subset of the receiver positions are time-aligned with respect to the difference between travel times for each possible noise source position. The time-aligned signals are then stacked. The noise source position is determined from the stacked, time-aligned signals. This result can then be used to construct a model of the noise at the receiver position.

20 Claims, 5 Drawing Sheets

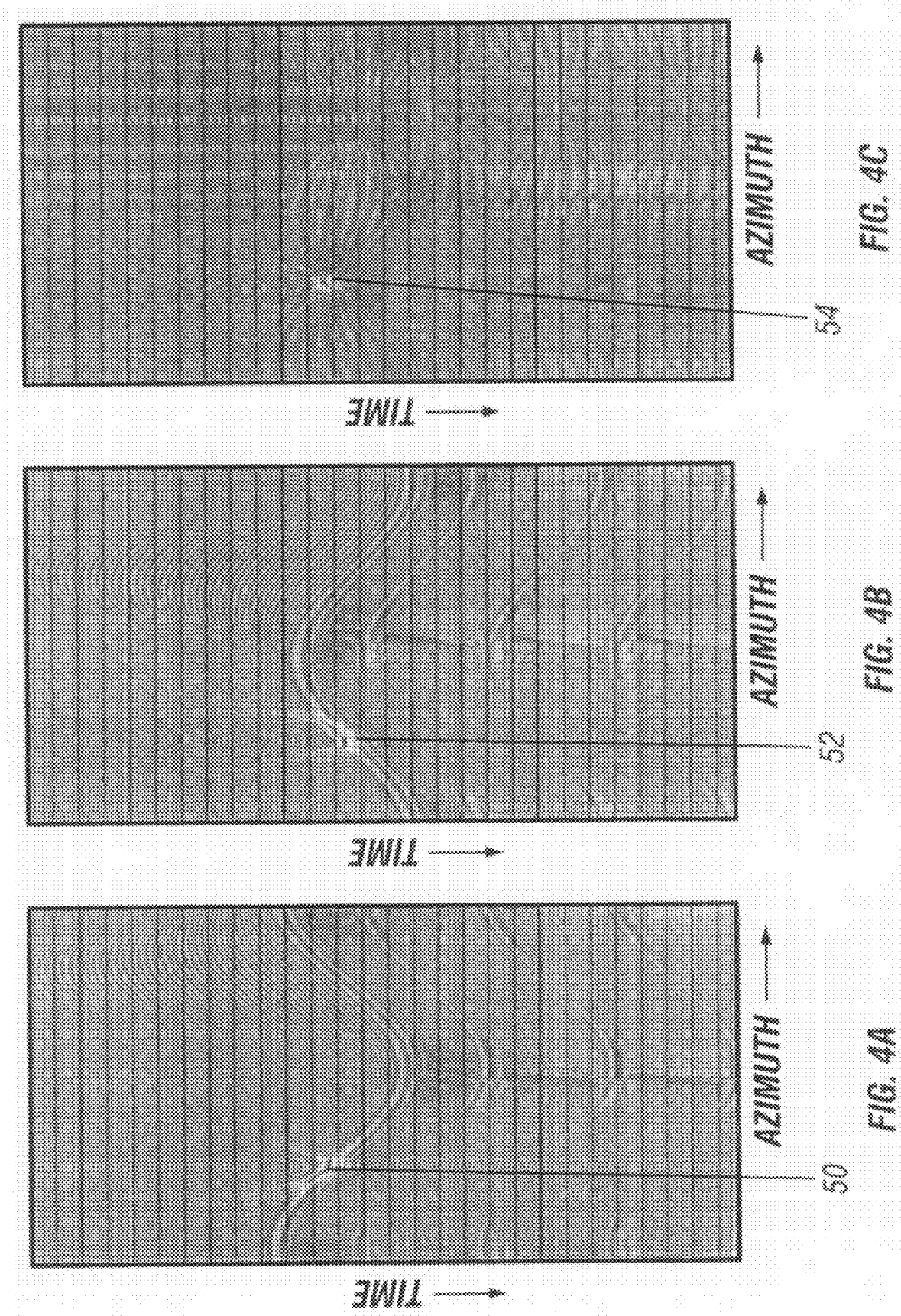

METHOD FOR NOISE SUPPRESSION IN SEISMIC SIGNALS USING SPATIAL TRANSFORMS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of seismic data acquisition and processing. More specifically, the invention relates to methods for processing seismic signals to attenuate the effects of certain types of noise in the seismic signals.

2. Background Art

Seismic surveying is known in the art for determining structures of rock formations below the Earth's surface. Seismic surveying generally includes deploying an array of seismic sensors at the surface of the earth in a selected pattern, and selectively actuating a seismic energy source positioned near the seismic sensors. The energy source may be an explosive, a vibrator, or in the case of seismic surveying performed in marine environments, one or more air guns or water guns.

Seismic energy which emanates from the source travels through the subsurface Earth formations until it reaches an acoustic impedance boundary in the formations. Acoustic impedance boundaries typically occur where the composition and/or mechanical properties of the earth formation change. Such boundaries are typically referred to as "bed boundaries." At a bed boundary, some of the seismic energy is reflected back toward the Earth's surface. The reflected energy may be detected by one or more of the seismic sensors deployed on the surface. Seismic signal processing known in the art has as one of a number of objectives the determination of the depths and geographic locations of bed boundaries below the earth's surface. The depth and location of the bed boundaries is inferred from the travel time of the seismic energy to the bed boundaries and back to the sensors at the surface.

Seismic surveying is performed in the ocean and other bodies of water ("marine seismic surveying") to determine the structure of Earth formations below the water bottom. Marine seismic surveying systems known in the art include a seismic survey vessel which tows one or more seismic energy sources, and the same or a different survey vessel which tows one or more "streamers." Streamers are arrays of seismic receivers or sensors disposed along a cable that is towed by the vessel. Typically, a seismic vessel will tow a plurality of such streamers' arranged to be separated by a selected lateral distance from each other, in a pattern selected to enable relatively complete determination of subsurface geologic structures in three dimensions. It is also known in the art to place cables having seismic sensors ("ocean bottom cables") along the water bottom, and actuate a seismic energy source in the water. Typically, the seismic energy source will be towed by a vessel just as in streamer-type surveying.

At the bed boundaries, as previously explained, some of the energy from the source is reflected and ultimately detected by the seismic sensors. In addition to reflected seismic energy both coherent noise and incoherent noise may be present in the detected seismic energy. The presence of noise in the energy detected by the seismic sensors reduces the signal to noise ratio ("SNR") of the seismic signals of interest. One objective of seismologists is, therefore, to seek methods of reducing the effects of noise on the signals detected by the sensors without appreciably reducing the true seismic signal component of the detected signals.

Prior art methods which have been used to reduce the effects of noise and acquire a higher quality representation of a particular subsurface structure include using multiple actuations of the seismic source (multiple "firings" or "shots") to record a plurality of sensor measurements from substantially the same subsurface structure, and then summing or "stacking" such measurements to enhance signal strength while substantially reducing the effects of random or incoherent noise.

U.S. Pat. No. 5,818,795 which is assigned to an affiliate of the assignee of the present invention, and which provides a detailed summary of prior art methods and systems addressing the problem of noise suppression in seismic signals, discloses a method of reducing the effect of "burst" noise in seismic signal recordings without eliminating seismic signals of interest.

U.S. Pat. No. 5,761,152, which is assigned to an affiliate of the assignee of the present invention, describes a method and system for marine seismic surveying. The method disclosed in the '152 patent includes increasing the fold (number of recorded reflections from a same reflector), and as a result the signal-to-noise ratio of coherent seismic signals, without incurring the problems of drag, entanglement, complicated deck handling associated with increased streamer length, increased number of streamers, and increased distance between streamers. Source and streamer "offsets", and time of firing of lead and trailing vessel sources in a time delay sequence are optimized to increase the fold while avoiding substantial influence by the seismic signals resulting from the source of one vessel on the seismic signals resulting from the source of the other vessel.

U.S. Pat. No. 6,751,999 issued to Fookes et al., which is assigned to an affiliate of the assignee of the present invention describes a method for attenuating noise from marine seismic signals caused by a noise in the water. The method includes determining an arrival time of a noise event at each of a plurality of seismic sensors, estimating a position of the noise source from the arrival times, and attenuating the noise event from the signals detected by the seismic sensors.

The foregoing description is not meant to be an exhaustive explanation of the types of noise and the methods for reducing the effects thereof in seismic signals. There are two types of noise, however, that continue to present a need for improved processing methods. One of these types of noise is generated by vessels or rigs in the vicinity of the seismic vessel (here termed "continuous ship noise"). The other type of noise is reflected impulsive noise which originates as a result of actuation of the seismic energy source and subsequent reflection of the seismic energy traveling laterally through the water to a reflector in the water, and then back to the sensors on the array (here termed "back scattered noise"). There continues to be a need for improved methods for attenuating back scattered noise and continuous ship noise in marine seismic data.

SUMMARY OF THE INVENTION

A method for identifying a position of a source of noise in a marine seismic record includes defining, for at least one shot record, a set of possible noise source positions. A difference between travel time of noise from each possible noise source position to each of a plurality receiver position for the at least one shot record is determined. Signals from at least a subset of the receiver positions are time-aligned with respect to the difference between travel times for each possible noise source position. The time-aligned signals are then stacked. The noise source position is determined from the stacked, time-aligned signals.

A method for marine seismic surveying according to another aspect of the invention includes towing a seismic energy source and a plurality of seismic streamers in a body of water. At selected times the source is actuated and signals detected by each of a plurality of receivers on each streamer are recorded. For each actuation a geodetic position of the source and a geodetic position of each receiver are determined. For each source actuation a set of possible noise source positions with respect to the source position at each actuation is defined. A difference between travel time of noise from each possible noise source position to each receiver position for each shot record is determined. Signals from each of a plurality of subsets of the receiver positions with respect to the difference between travel times for each possible noise source position for each shot record are determined. The time-aligned signals for each shot record are stacked. The noise source position for each shot record is determined from the stacked signals.

Other aspects and advantages of the invention will be apparent from the following description and the appended claims.

BRIEF DESCRIPTION OF THE DRAWINGS

FIGS. 4A through 4C show examples of seismic data processed according to one embodiment of a method according to the invention.

DETAILED DESCRIPTION

Figure 1:
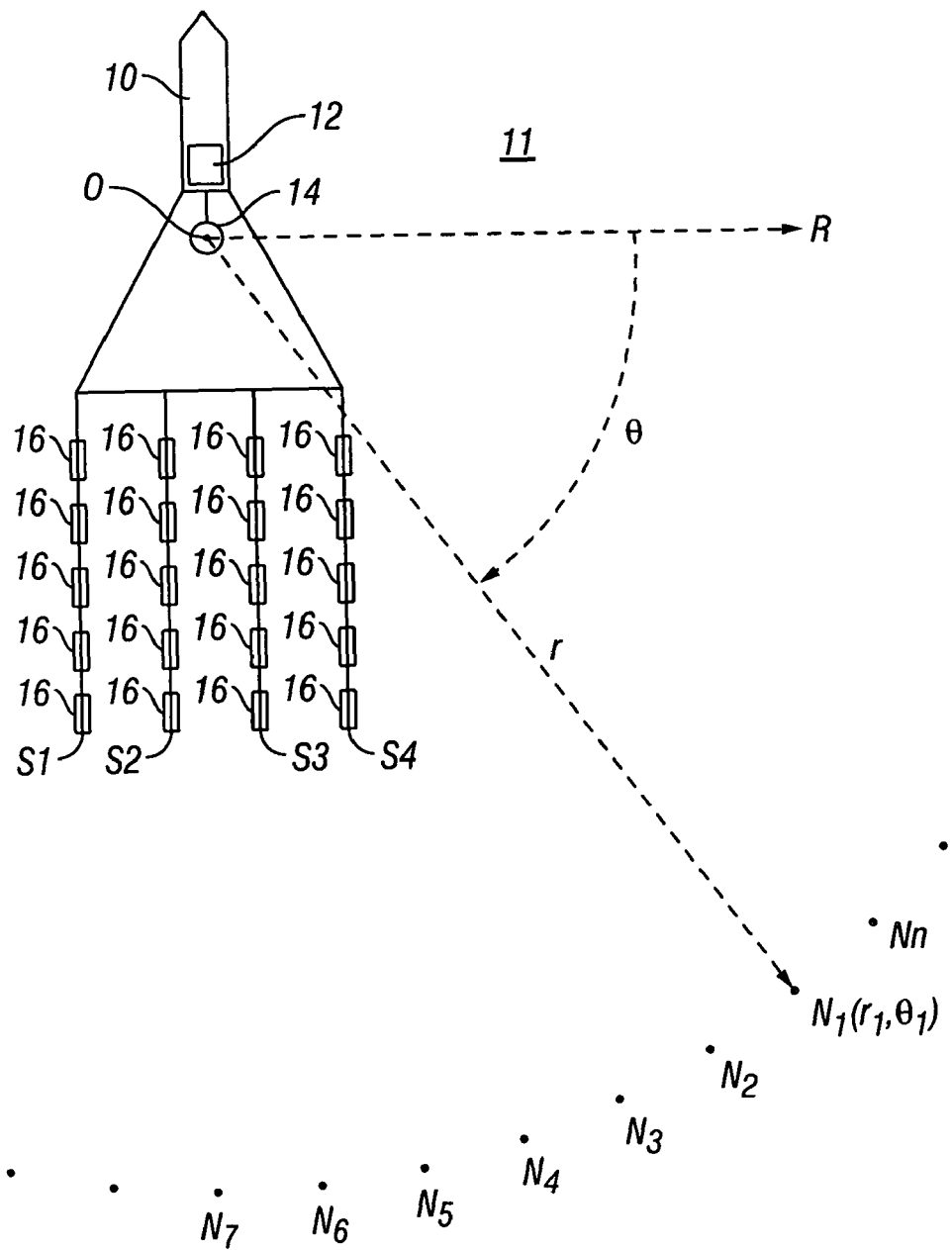
FIG. 1 shows an example seismic acquisition system as related to a noise source coordinate system according to the invention.

An example marine seismic acquisition system that can acquire seismic data for use with methods according to the various aspects of the invention is shown schematically in FIG. 1. A seismic vessel 10 is shown towing a plurality of laterally spaced apart streamers S1, S2, S3, S4 through a body of water 11 such as a lake or the ocean. The seismic vessel 10 includes equipment thereon shown generally at 12 and referred to for convenience as a "recording system" that includes devices (none of the following shown separately) for navigation, seismic energy source control, timing and recording of seismic signals detected by each of a plurality of longitudinally spaced apart seismic receivers 16 along each streamer S1, S2, S3, S4. The recording system 12 at selected times causes actuation of a seismic energy source 14, such as an air gun or array of such air guns. The seismic energy source 14 is showed being towed by the seismic vessel 10 but as will be appreciated by those skilled in the art, the vessel that actually tows the seismic energy source may be a different vessel. Further, the number of such sources or arrays thereof and the number of streamers and their lateral spacing are not limits on the scope of this invention.

The seismic receivers 16 detect seismic energy reflected by acoustic impedance boundaries in the formations below the bottom of the body of water. The signals generated by the receivers 16 in response to detecting the reflected seismic energy are the signals of interest in interpreting structure and composition of the formations below the water bottom.

In recording such seismic signals, at the time of each actuation of the seismic energy source 14, the recording system initiates generation of a time indexed (typically with respect to the source actuation time) record of the signals produced by each receiver 16. The geodetic position of the source 14 and each receiver 16 at the time of each source actuation is also indexed to the signal records. The foregoing information recorded for each individual source actuation is known as a "shot record."

There may be one or more sources of noise in the water 11, for example, other vessels, oil and gas producing facilities and other devices, that produce acoustic energy that is also detected by the receivers 16. Such noise, previously identified as continuous ship noise and back scattered noise, may interfere with analysis of the detected seismic signals. In a method according to the invention, such noise may be identified in the recorded seismic signals and attenuated by a process performed as follows.

A set of possible locations or position for the noise source, for each shot record, shown at $N_1$ through Nn in FIG. 1, can be predefined. In one example, the possible predefined locations $N_1$ through Nn can be defined on circles, each such circle having a selected radius, r, from a predefined origin O. In the present example, the predefined origin O can be the geodetic position of the seismic energy source 14 at the time of actuation. The actual origin used in any example is a matter of choice for the system designer and is not intended to limit the scope of the invention.

An angle θ which defines the second coordinate of the predefined noise source positions along a defined circle may be defined with respect to any selected reference. In the present example, the selected reference R may be a geodetic reference, such as geographic North, that is, when θ=0, the noise source position is at a distance r from the seismic energy source 14 in a direction North of the position of the seismic energy source 14 (and of the origin O). The reference R may also be, for example, the geodetic direction of travel of the vessel 10 or any other reference that enables azimuthal definition of possible noise source positions with respect to a direction. For each shot record, a set of such possible noise source positions (shown along a single circle of radius r as $N_1$ through Nn) may be defined along circles using a selected increment of the reference angle θ, for example, five or ten degrees, and a selected increment of the radius r.

Figure 2:
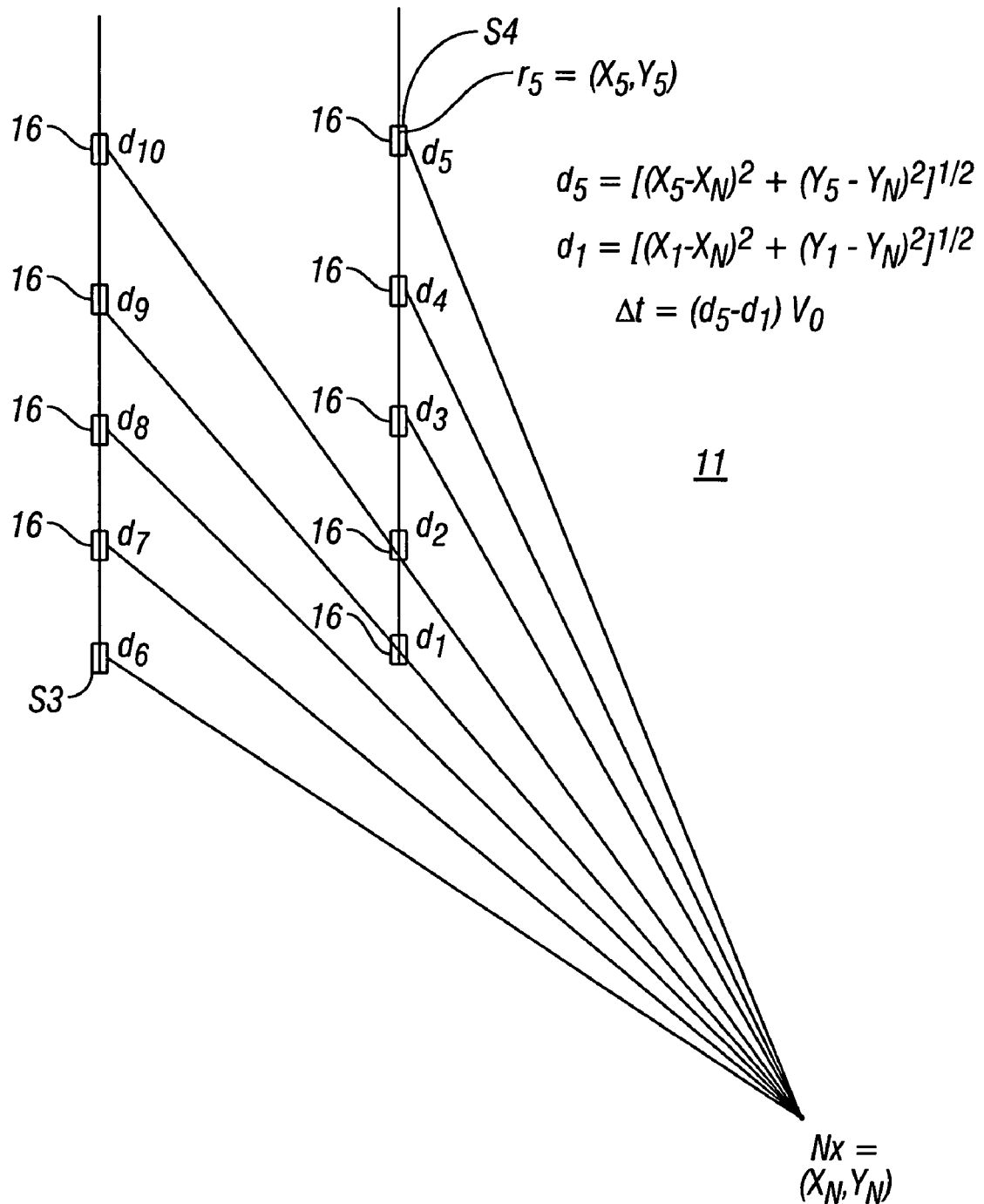
FIG. 2 shows two of the streamers from the system of FIG. 1 in more detail to illustrate a noise travel time difference calculation according to one example of a method according to the invention.

Referring to FIG. 2, two of the streamers S3 and S4 are shown in more detail with one of the defined possible noise source positions Nx to illustrate a calculation used in a method according to the invention. For each defined possible noise source position Nx, there is a particular distance between such defined noise source position Nx and each seismic receiver 16. Such distances are shown in FIG. 2 as $d_1$ through $d_{10}$. An amount of time for noise to travel from each possible defined noise source position Nx to each seismic receiver 16 will be related to the distance ($d_1$ through $d_{10}$) between each receiver and each possible noise source position Nx and the seismic velocity of the noise. Thus, for each receiver 16 it is it possible to define an expected noise arrival time for each possible noise source position Nx. It is also possible to define a difference between expected noise arrival times at each receiver with respect to a reference receiver (or any other receiver). In the example shown in FIG. 2, if the reference receiver is shown at $r_5$, then a distance $d_5$ between the reference receiver and the possible noise source position Nx may be calculated as follows:

$$d_5=[(x_5-x_N)^2+(y_5-y_N)^2]^{1/2}$$

wherein x and y represent the geodetic coordinates for each of the reference receiver $r_5$ and the possible noise source position Nx, respectively, in a Cartesian coordinate system defined with respect to the origin (O in FIG. 1). The geodetic coordinates of each of the receivers 16 and the source (14 in FIG. 1) if used as the origin O can determined by certain equipment in the recording system (12 in FIG. 1) for each shot record. The geodetic coordinates of each possible noise position Nx can be defined along circles, as previously explained. The coordinates of each possible noise position are defined by coordinates ($r_x$, $\theta_x$) as previously explained. A similar calculation for the distance between the possible noise source position Nx and each of the other receivers 16 can be made for each shot record, and for each defined possible noise source position. The Cartesian coordinates with respect to the origin O of each defined possible noise position (defined above using polar coordinates) may be calculated by the expression:

$$x_N=r\cos\theta$$

$$y_N=r\sin\theta$$

and the foregoing Cartesian coordinates for each of the defined noise source positions Nx can then used to determine distances between each receiver position and each defined possible noise source position for each shot record.

Having thus determined a difference between distances to each possible noise source position for each receiver with respect to a reference receiver, a difference between noise travel times from each defined possible noise source position Nx to each receiver 16 can be computed for each receiver with respect to the reference receiver (which may be any selected receiver in the acquisition system) using the following expression:

$$\Delta t=(d_q-d_1)/v_0$$

wherein $d_1$ represents the distance between the defined possible noise source position Nx and the reference receiver, and $d_q$ represents the distance between the q-th receiver and the defined possible noise source position Nx. $v_0$ represents the seismic velocity of the noise. Noise seismic velocity for marine seismic surveys will typically equal the seismic velocity of the water, although the noise velocity may depend on the water depth, the overall distance to the noise source from the receivers and the seismic velocity of the formations proximate the water bottom. In some examples, the noise velocity $v_0$ may be adjusted and the foregoing time difference calculations repeated for the adjusted velocity. The original set of, and the repeated time difference calculations, may be used as explained below.

The foregoing noise travel time differences can be used to time align the signals recorded from each of the receivers. The time alignment can be performed by linearly time-shifting the recorded signals from each receiver such that the noise, if it originated from the predefined noise source position Nx, would be present in the signals of all the receivers at substantially the same time. The foregoing is repeated for all defined possible noise source positions Nx.

The time-aligned seismic signals for each defined possible noise source position can then be summed or stacked. Stacking may be performed for the time-aligned signals from all the receivers in the seismic acquisition system, or may in some examples be performed for each of a plurality of selected subsets of all the receivers, although the reference receiver used to calculate the time differences will be the same. In one example, the time-aligned signals from each streamer can be summed or stacked. The result is a stacked signal record for each streamer related to each predefined possible noise source position Nx.

The stacked signals ("traces") for each predefined noise source position, for each streamer, may then be evaluated to determine a most likely noise source position. For the predefined noise source position Nx that most likely represents the actual noise source position, a high signal amplitude event may be observed in the stacked traces corresponding to the most likely noise source position. In one example, the stacked, time-aligned signals are evaluated by scanning with respect to the azimuthal angle $\theta$ for each radius r of each possible noise source position Nx. A possible benefit of stacking time aligned signals in subsets, such as all receivers on individual streamers as explained above is that in some instances more than one possible noise source position will indicate a high amplitude event in the stacked, time-aligned signals. If the stacked, time-aligned signals are processed in subsets as explained above, it is more likely that only one possible noise source position (for each actual noise source) will indicate the same high amplitude event in each of a plurality of subsets of time-aligned, stacked signals. For example, the time-aligned, stacked signals from each streamer, processed as explained above, may then be median filtered to identify the single most likely noise source position.

Figure 3:
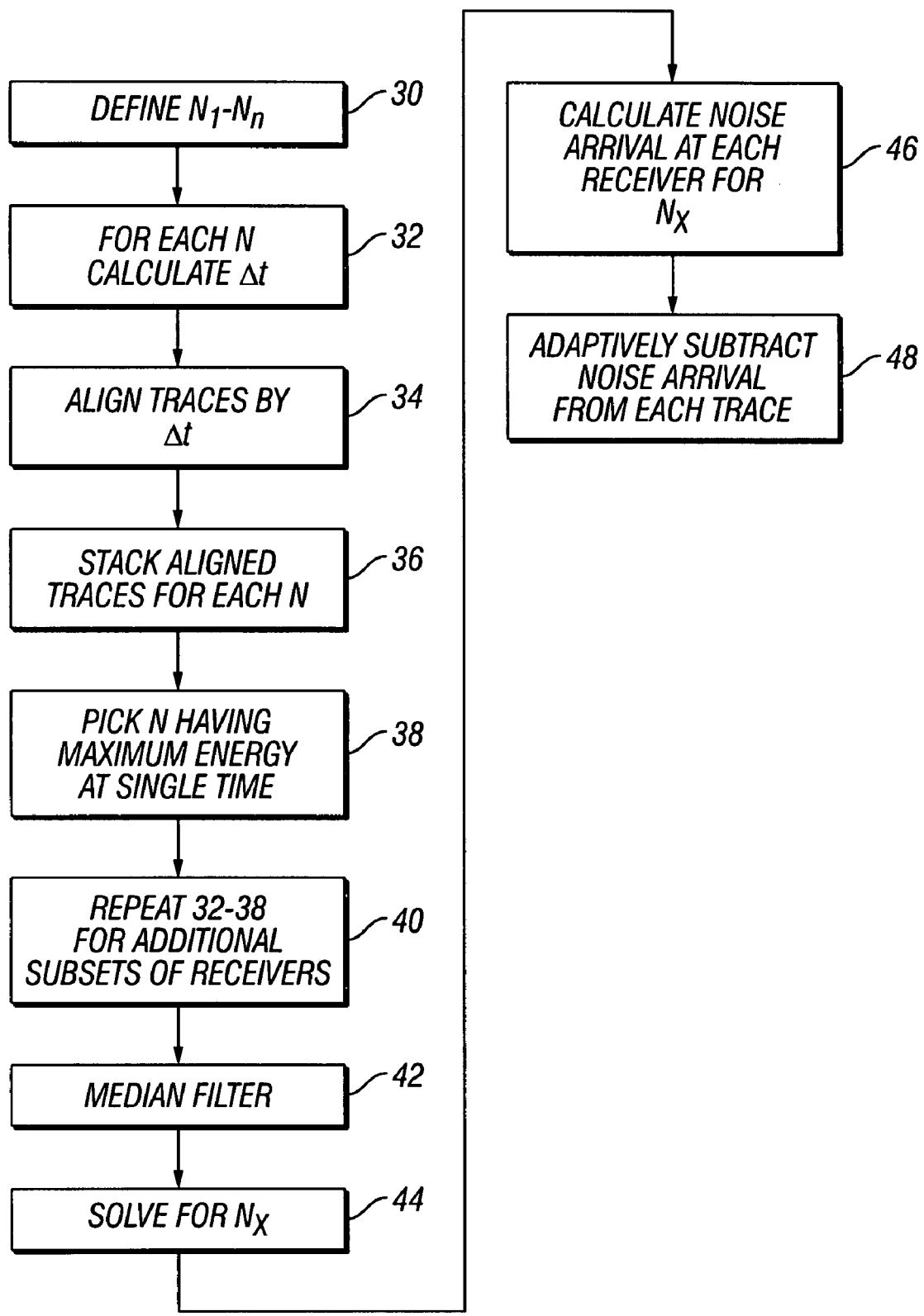
FIG. 3 is a flow chart of an example implementation of a method according to the invention.

FIG. 3 shows a flow chart of an example process as explained above. For each shot record, at 30, a set of possible noise source positions is defined. A differential travel time of noise from each of the noise source positions to each receiver is calculated, for each shot record, at 32. The signals are time aligned at 34. The time-aligned signals are stacked for each possible noise source position at 36. The possible noise source position N having the maximum energy is then selected for each subset of receivers at 38. The above procedures 32, 34, 36 and 38 are repeated for each subset of receivers (e.g., for each streamer). The results from all the streamers (subsets of receivers) may be aligned by common azimuth (angle $\theta$) of possible noise source positions and then median filtered to determine the one or more noise source positions at 44.

To attenuate the effects of the noise in the recorded signals, an expected arrival time for the noise, with respect to the determined noise source position and the receiver positions for each shot record for each receiver is then determined, at 46. The noise event is then adaptively subtracted from the recorded signal of each receiver at the calculated noise arrival time, at 48. The result is seismic data having reduced effect of coherent noise from, for example, sources in the water such as other seismic vessels and drilling platforms.

Examples of seismic data processed as explained above are shown in FIGS. 4A, 4B and 4C. FIG. 4A shows signals from one streamer in an array of streamers (such as shown in FIG. 1) that are time aligned and stacked as explained above. The display in FIG. 4A includes a plurality of side by side, time aligned, stacked traces for each defined azimuth direction of the possible noise source position along one circle (defined as explained above). At 50, a high amplitude event can be observed in the time aligned, stacked traces for a number of adjacent defined azimuths. The high amplitude event 50 indicates some uncertainty in the calculation of azimuth of the noise source position. A similar display for the seismic signals obtained from a different streamer in the same acquisition system is shown in FIG. 4B. A high amplitude event 52 in the time aligned, stacked signals in FIG. 4B also shows some uncertainty as to azimuth of the position of the noise source. FIG. 4C shows the time aligned, stacked signals from FIGS. 4A and 4B after being median filtered. Note that a high amplitude event 54 shows considerably less azimuth uncertainty as to position of the noise source.

Figure 5C:
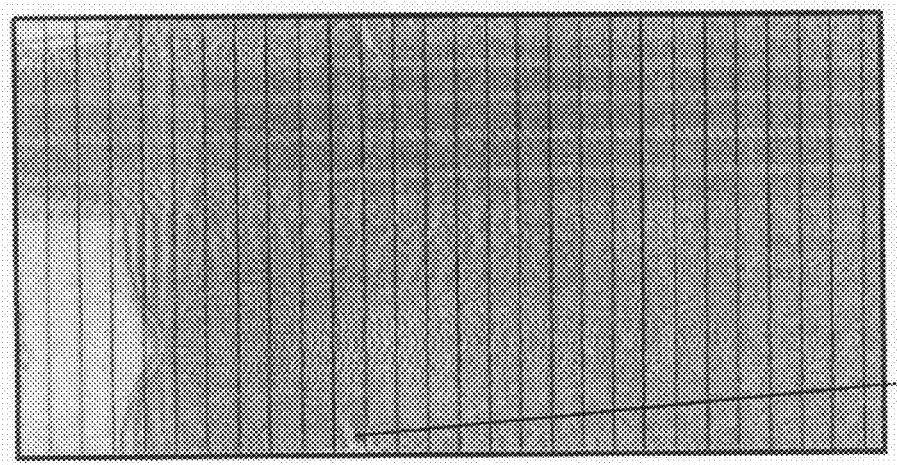
FIGS. 5A through 5C show examples of seismic data processed according to one embodiment of a method according to the invention.
Figure 5B:
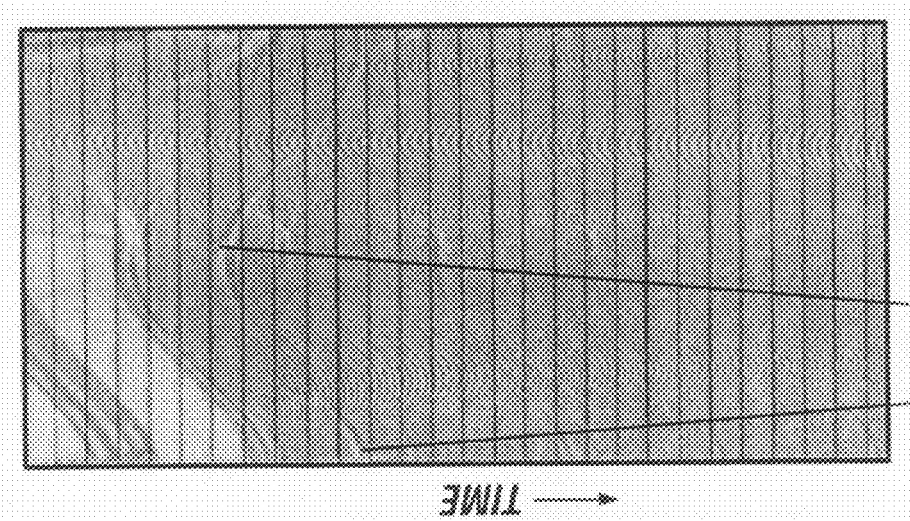
Figure 5A:
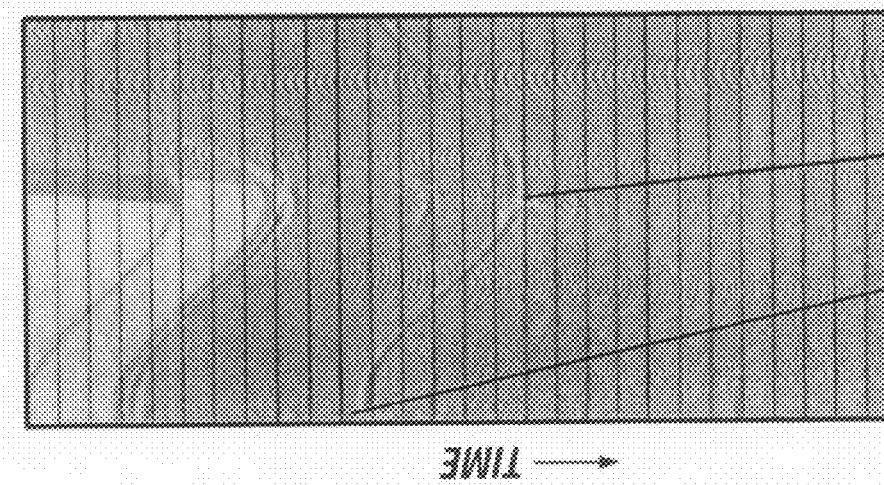

Similar displays of time aligned, stacked signals are shown in FIG. 5A, wherein for one of the streamers in an array, a first high amplitude event 56 is observable along a first azimuth 56 and in a second high amplitude event 58 is observable along a second azimuth. The two high amplitude events 56, 58 may represent the same possible noise source position, but in some circumstances two possible noise source positions will result in a high amplitude event in the time aligned, stacked traces. A similar display for traces from another streamer in the same array is shown in FIG. 5B, where high amplitude events 60, 62 are observable along more than one azimuth. By median filtering the traces from FIGS. 5A and 5B, median stacked, time aligned, stacked traces will produce a display that has only one high amplitude event 64. Thus, median filtering the traces from different subsets of receivers (e.g., different streamers) may lead to a unique solution to the position of the noise source.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for identifying a position of a source of noise in a marine seismic record, comprising:
    defining for at least one shot record a set of possible noise source positions, the at least one shot record comprising recordings indexed with respect to actuation time of a seismic energy source of signals detected by each of a plurality of seismic receivers deployed in a body of water, the signals detected in response to the actuation of the seismic energy source;
    calculating a difference between travel time of noise from each possible noise source position to each of a plurality receiver position for the at least one shot record;
    time-aligning signals from at least a subset of the receiver positions with respect to the difference between travel times for each possible noise source position;
    stacking the time-aligned signals and
    determining the noise source position from the stacked signals.

2. The method of claim 1 wherein the difference between travel times is determined by calculating a distance between each possible noise source position and each receiver in the at least one subset.

3. The method of claim 2 further comprising adjusting a velocity of noise and repeating the calculating difference, time-aligning, stacking and determining noise source position.

4. The method of claim 1 wherein the set of possible noise source positions is defined along at least one circle having a selected radius from an origin.

5. The method of claim 1 wherein the origin is defined as a position of a seismic energy source for the at least one shot record.

6. The method of claim 1 wherein the at least one subset comprises receivers along a first selected seismic streamer in a seismic acquisition system having a plurality of streamers.

7. The method of claim 6 wherein the calculating difference, time-aligning, stacking and determining noise source position is repeated for at least one additional subset of receivers.

8. The method of claim 7 wherein the at least one additional subset comprises a second selected streamer in the seismic acquisition system.

9. The method of claim 7 further comprising aligning the stacked signals from the first streamer and the stacked signals from the second streamer with respect to a common azimuth for each possible noise source position and median filtering the azimuthally aligned stacked signals to identify the noise source position.

10. The method of claim 1 further comprising determining an expected arrival time of a noise event in signals from each receiver from the determined noise source position and adaptively subtracting noise from signals from each seismic receiver based on the expected noise travel time to each receiver.

11. A method for marine seismic surveying, comprising:
    towing a seismic energy source and a plurality of seismic streamers in a body of water;
    at selected times actuating the source and recording signals detected by each of a plurality of receivers on each streamer;
    determining for each actuation a geodetic position of the source and a geodetic position of each receiver;
    defining for each source actuation a set of possible noise source positions with respect to the source position at each actuation;
    calculating a difference between travel time of noise from each possible noise source position to each receiver position for each shot record;
    time-aligning signals from each of a plurality of subsets of the receiver positions with respect to the difference between travel times for each possible noise source position for each shot record;
    stacking the time-aligned signals for each shot record; and
    determining the noise source position for each shot record from the stacked signals.

12. The method of claim 11 wherein the difference between travel times is determined by calculating a distance between each possible noise source position and each receiver in each subset.

13. The method of claim 12 further comprising adjusting a velocity of noise and repeating the calculating difference, time-aligning, stacking and determining noise source position for each shot record.

14. The method of claim 11 wherein the set of possible noise source positions is defined along at least one circle having a selected radius from an origin for each shot record.

15. The method of claim 11 wherein the origin is defined as the position of the seismic energy source for each shot record.

16. The method of claim 11 wherein each subset comprises the receivers in a selected one of the streamers.

17. The method of claim 16 wherein the calculating difference, time-aligning, stacking and determining noise source position is repeated for at least one additional subset of receivers.

18. The method of claim 17 wherein the at least one additional subset comprises a second one of the streamers.

19. The method of claim 18 further comprising aligning the stacked signals from the first streamer and the stacked signals from the second streamer for each sot record with respect to a common azimuth for each possible noise source position, and median filtering the azimuthally aligned stacked signals to identify the noise source position for each shot record.

20. The method of claim 11 further comprising determining an expected arrival time of a noise event in signals from each receiver from the determined noise source position for each shot record and adaptively subtracting noise from signals from each seismic receiver based on the expected noise travel time to each receiver for each shot record.

* * * * *